United States Patent
MacLachlan

(10) Patent No.: US 6,578,704 B1
(45) Date of Patent: Jun. 17, 2003

(54) BELTS AND BELT MODULES FOR SPIRAL CONVEYORS

(75) Inventor: Gilbert J. MacLachlan, Chalmette, LA (US)

(73) Assignee: The Laitran Corporation, Harahan, LA (US)

( * ) Notice: Subject to any disclaimer, the term of this patent is extended or adjusted under 35 U.S.C. 154(b) by 0 days.

(21) Appl. No.: 10/065,777

(22) Filed: Nov. 18, 2002

(51) Int. Cl.⁷ ................................................ B65G 13/02
(52) U.S. Cl. ...................................... 198/778; 198/853
(58) Field of Search ................................ 198/778, 779, 198/839, 845, 853

(56) References Cited

U.S. PATENT DOCUMENTS

| | | | |
|---|---|---|---|
| 3,693,780 A | 9/1972 | Fraioli, Sr. | 198/182 |
| 3,854,575 A | 12/1974 | Fraioli, Sr. | 198/182 |
| 3,951,256 A | 4/1976 | Gurewitz | 198/182 |
| 4,410,081 A * | 10/1983 | Weihe, Jr. | 198/725 |
| 4,883,160 A * | 11/1989 | Sansevero et al. | 198/328 |
| 4,884,673 A * | 12/1989 | Rivera | 198/328 |
| 4,901,844 A | 2/1990 | Palmaer et al. | 198/778 |
| 4,941,566 A | 7/1990 | Irwin | 198/778 |
| 5,009,302 A * | 4/1991 | Sansevero | 198/328 |
| 5,069,330 A | 12/1991 | Palmaer et al. | 198/778 |
| 5,070,999 A | 12/1991 | Layne et al. | 198/778 |
| 5,133,449 A | 7/1992 | Spangler | 198/778 |
| 5,137,141 A | 8/1992 | Irwin | 198/778 |
| 5,139,135 A | 8/1992 | Irwin et al. | 198/852 |
| 5,280,833 A | 1/1994 | Robin | 198/831 |
| 5,310,045 A | 5/1994 | Palmaer et al. | 198/778 |
| 5,467,865 A | 11/1995 | Irwin | 198/778 |
| 5,775,480 A | 7/1998 | Lapeyre et al. | 198/831 |
| 6,237,750 B1 | 5/2001 | Damkjaer et al. | 198/778 |
| 6,386,355 B1 * | 5/2002 | Willems | 198/852 |
| 6,471,046 B2 * | 10/2002 | Layne et al. | 198/831 |
| 6,484,379 B2 * | 11/2002 | Palmaer | 29/401.1 |
| 6,494,312 B2 * | 12/2002 | Costanzo | 198/779 |

* cited by examiner

Primary Examiner—Christopher P. Ellis
Assistant Examiner—Richard Ridley
(74) Attorney, Agent, or Firm—James T. Cronvich

(57) ABSTRACT

A spiral conveyor with a belt having rollers at the inside edge. The spiral conveyor includes a rotating tower with a conveyor belt following a helical path around the tower. Rollers extending outward from the inner side edge of the belt have an axis of rotation generally parallel to the helical path. The rollers engage the outer surface of the tower in high-friction rubbing contact in the circumferential direction, but in low friction rolling contact in the vertical direction to provide a low-tension spiral conveyor system. The belt is preferably a modular conveyor belt constructed of a series of rows of belt modules connected together at hinge joints.

18 Claims, 5 Drawing Sheets

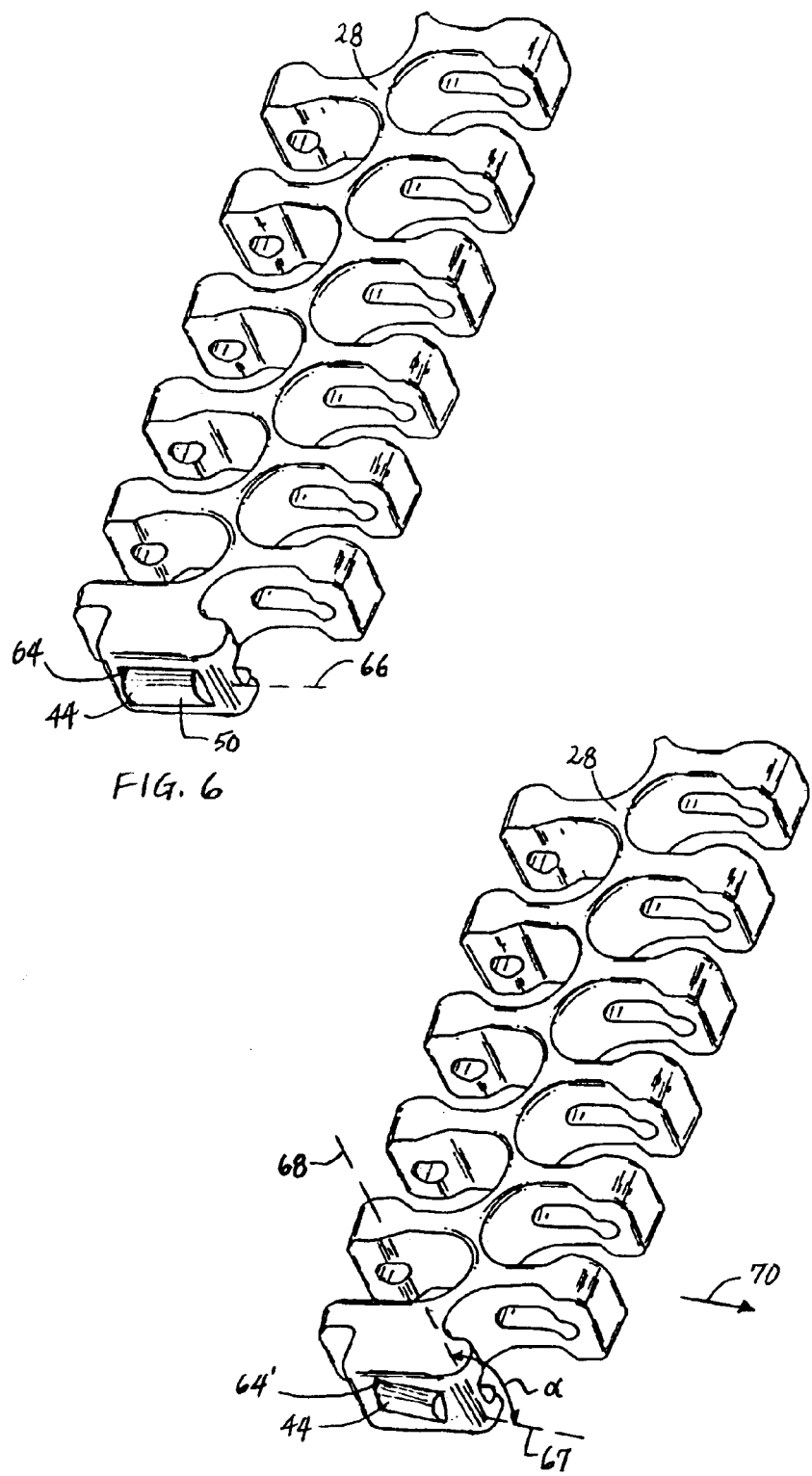

BELTS AND BELT MODULES FOR SPIRAL CONVEYORS

BACKGROUND OF INVENTION

This invention relates to power-driven conveyors generally and, more particularly, to spiral conveyors and conveyor belts therefor.

Spiral conveyors are well known in the bakery and frozen food industries. By providing a multi-layer helical conveying path, a spiral conveyor requires significantly less floor space than a conventional horizontal conveyor. Such a compact conveyor is especially useful for conveying products inside ovens and freezers.

A typical spiral conveyor includes a cylindrical tower, cage, or drum rotating about a vertical axis. A conveyor belt is wrapped helically around the rotating drum. As the drum rotates, it drives the belt by its engagement with the inside edge of the belt. Various take-up and feed sprockets define the belt's conveying path from the point of its exit from the drum to its entry point back onto the drum.

The drum is driven in an overdrive condition in which its outer driving surface moves at a speed greater than the speed of the belt. Although slip between the belt and the drum is desirable, too much slip means inefficient driving engagement. To improve the driving engagement, the inside edge of the belt or the outer surface of the drum often includes protrusions or frictional elements that increase the friction or the engagement between drum and belt. But, in increasing the horizontal friction, the vertical friction is also increased. This makes it more difficult for the belt to ascend or descend, as it must, in following its helical path around the drum.

Conveyor belts with rollers at the edges are used in low-friction applications. The rollers engage bearing surfaces on side rails in rolling contact to reduce the friction between belt and rail, especially as a belt negotiates a turn. But the rollers in such belts are arranged to rotate about a vertical axis so as to reduce horizontal friction. Such a belt would not work well in a spiral conveyor system.

SUMMARY OF INVENTION

A spiral conveyor embodying features of the invention comprises a cylindrical tower with an outer surface and a modular conveyor belt traveling around it in a helical path. The tower rotates about a vertical axis. The belt is arranged to move in a helical path around the tower. An inner belt edge is proximate to the outer surface of the tower. Rollers disposed at the inner edge engage the outer surface of the tower in rolling contact. The rollers have an axis of rotation oriented to provide less friction between the conveyor belt and the tower for the component of motion up or down the tower than for the component of motion circumferentially around the tower.

One version of the conveyor belt comprises a series of rows of belt modules. Each row extends in a longitudinal direction from a first end to a second end, in a lateral direction from a first side edge to a second side edge, and in a thickness direction from a top side to a bottom side. Consecutive rows are hingedly connected end to end to form the conveyor belt. A first roller extends outward from the first side edge of selected rows of belt modules. The roller has an axis of rotation oriented generally perpendicular to the lateral direction. The axis of rotation forms a non-zero angle with the thickness direction.

BRIEF DESCRIPTION OF DRAWINGS

These features, as well as advantages and other aspects of the invention, are described in more detail in the following description, appended claims, and accompanying drawings in which:

FIG. 6 is an isometric view of a side edge of yet another version of conveyor belt embodying features of the invention showing a roller extending from a cavity in the side of the belt;

FIG. 7 is an isometric view of a conveyor belt as in FIG. 6 with the roller arranged to rotate about a different axis from the roller in FIG. 6.

DETAILED DESCRIPTION

Figure 1:
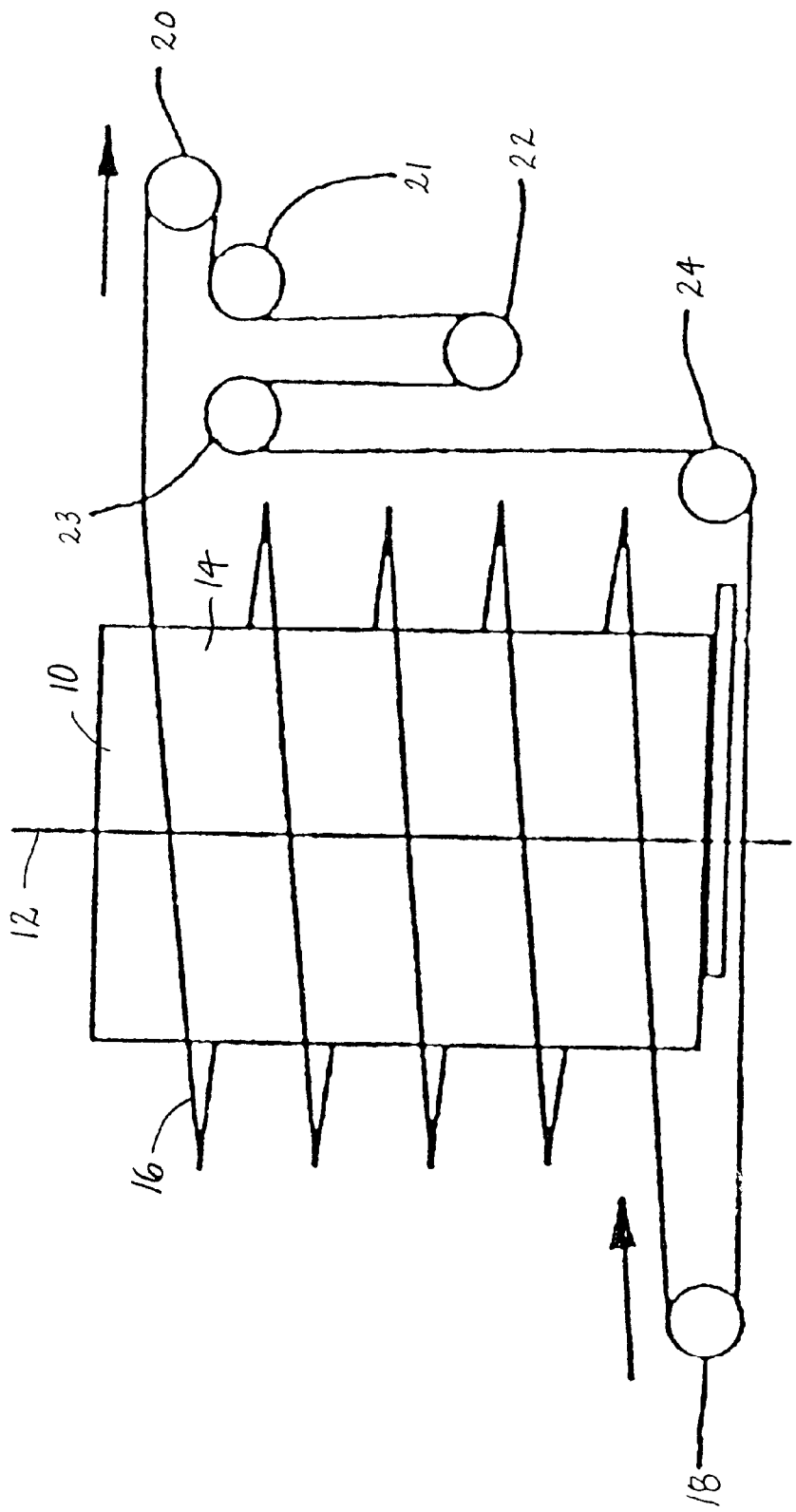
FIG. 1 is a schematic of a spiral system embodying features of the invention.

A spiral conveyor is shown schematically in FIG. 1. The spiral conveyor includes a tower 10 in the form of a cylinder that rotates about a vertical axis 12. The tower can be a drum with a continuous outer surface 14, or a cage with a plurality of spaced-apart vertical bars or strips forming the outer surface. A conveyor belt 16 follows a multi-level helical path around the tower. The inside edge of the belt contacts the outer surface of the tower and receives a largely frictional driving force from the tower as it rotates. In a well-adjusted spiral system, the outer surface of the tower travels at a greater angular speed than the belt. Thus, the belt is allowed to slip as the tower rotates. A primary drive sprocket 18 is positioned near the lower entry end of the tower. In its helical path, the belt rides around and up the outer surface of the tower. Upon its exit from the top of the tower, the belt travels around various take-up and feed sprockets 20–24 as it makes its way back toward the entry end.

Figure 2:
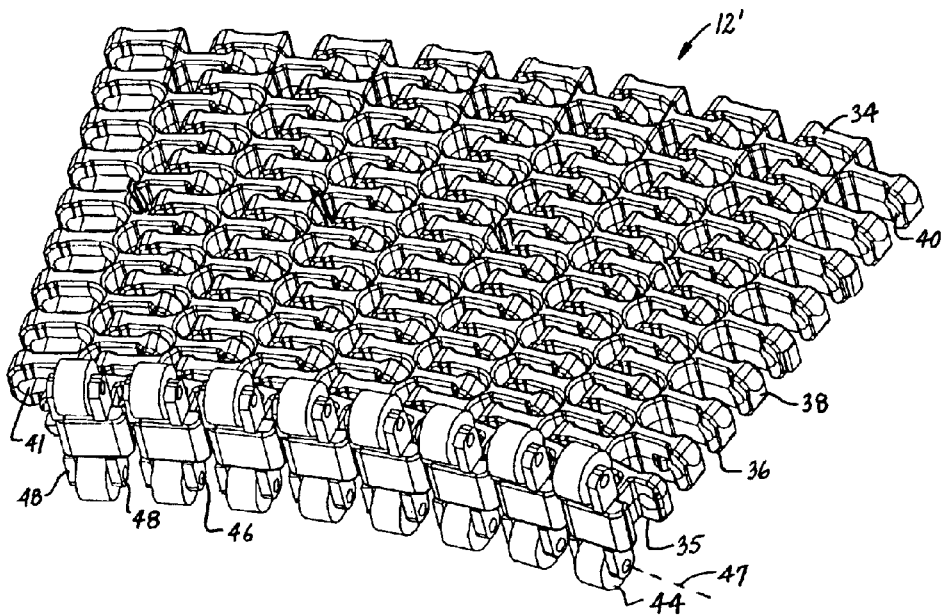
FIG. 2 is an isometric view of a portion of a modular conveyor belt usable in a spiral conveying system as in FIG. 1.
Figure 3:
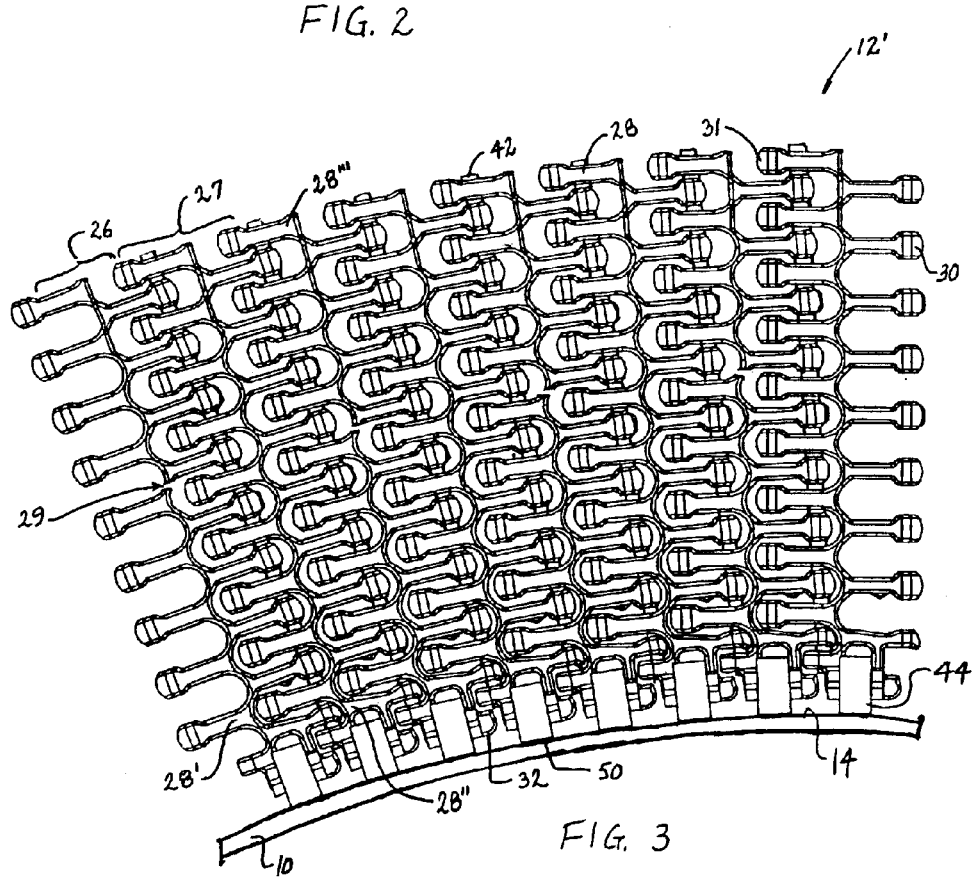
FIG. 3 is a top plan view of the conveyor belt of FIG. 2, also showing a portion of a spiral conveyor tower as in FIG. 1.

The belt 12, represented schematically in FIG. 1, can be realized by a roller-edge belt 12', an edge portion of which is shown in FIGS. 2 and 3. The belt is constructed of a series of rows 26, 27 of belt modules 28. Each belt row could be formed of a single module or of a number of side-by-side modules. If made of multiple modules per row, the belt would preferably be bricklaid in a pattern of short edged modules 28', long edge modules 28", intermediate modules 28''', and opposite edge modules. In the bricklay pattern, seams 29 between modules are offset row to row to limit the weakening effect of the seams on the beam strength of the belt. Each row extends in the longitudinal direction from a first end 30 to a second end 31 and laterally from a first side edge 32 to an opposite second side edge (not shown in this one-sided edge view of the belt). Each module extends in thickness from a top side 34 to a bottom side 35. The top side forms a conveying surface atop which products are conveyed. The bottom side includes drive structure, such as angled flat surfaces 36 at the bottom corners of hinge eyes 38 along each end of a module in this example. The angled surfaces receive a driving force from the teeth of the drive, take-up, and feed sprockets. The hinge eyes also include aligned apertures 40, 41. The hinge eyes along the first end of a row are interleaved with the hinge eyes along the second end of a consecutive row and are connected by a hinge pin 42 installed in the aligned apertures in the interleaved hinge eyes. In this way, a hinge joint is formed between consecutive belt rows. The apertures 41 along the first end 30 are elongated in the longitudinal direction of belt travel to allow the belt to collapse at the inside of a turn. (An example of a modular plastic conveyor belt having many of these features is the Series 2400 belt manufactured and sold by Intralox, Inc., of Harahan, La., USA.) The belt 12' has rollers 44 along the first side edge 32 of each row. The rollers have a central bore to accommodate an axle 46 defining an axis of rotation 47 about which the rollers can rotate. In FIGS. 2 and 3, the axis of rotation is in the longitudinal direction of each module and perpendicular to the lateral direction. The ends of the axles are retained in stanchions 48, which support the rollers at the edge of the belt. In the version shown, each row has a pair of rollers with parallel axes. A salient portion 50 of the rollers extends beyond the first side edge 32 of the belt. In this way, the roller contacts the outer surface 14 of the rotating spiral tower 10.

Figure 4:
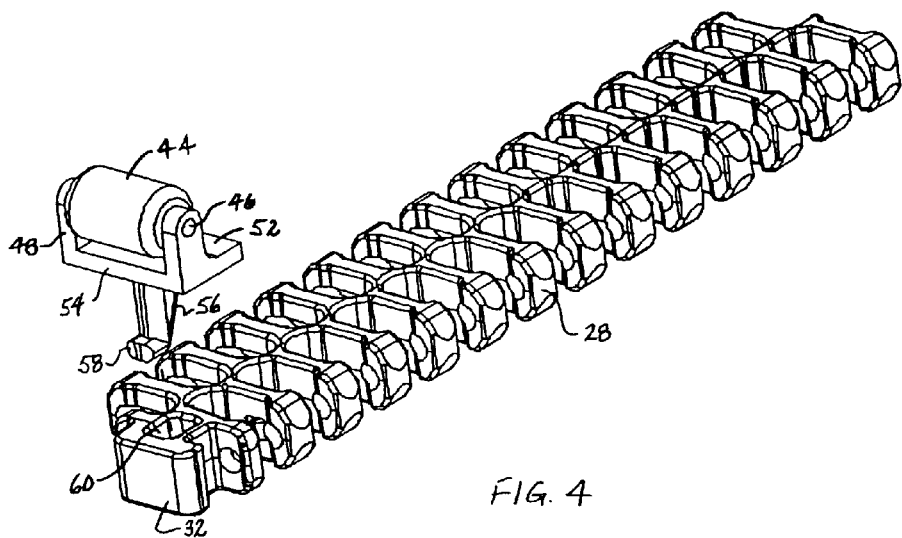
FIG. 4 is a perspective view of an edge module of a belt as in FIGS. 2 and 3 illustrating a detachable roller assembly.

The support stanchions can be unitarily molded with the belt module bodies 28 as a single piece or can be formed as part of a detachable roller assembly 52, as shown in FIG. 4. The roller assembly includes a base 54 from which unitary stanchions 48 extend. A roller 44 and its axle 46, or stubs unitarily formed on or pressed into the roller, are retained in the stanchion. Extending from the opposite side of the base of the roller assembly is a shank 56 that terminates in a tab 58. The shank is received in a hole 60 extending through the thickness of the first side edge of the module. The bottom of the base rests on the top side of the belt. The tab extends through the hole and holds the roller assembly in place against the bottom side of the belt. Another similar roller assembly having an oppositely directed tab can be mounted from the bottom side of the belt to produce a two-roller arrangement as in FIGS. 2 and 3.

Figure 5:
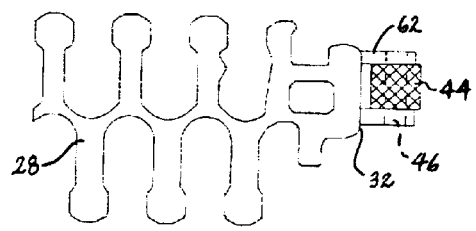
FIG. 5 is a top plan view of a side edge module of another version of conveyor belt embodying features of the invention and usable in a spiral system as in FIG. 1.

Another version of a belt edge module useful in this application is shown in FIG. 5. Outwardly extending supports 62 are integrally molded with the module 28 at its side edge 32. The supports retain an axle 46 about which a roller 44 can rotate. In this version, only a single roller is shown positioned at the first side edge.

Yet another version of single-roller belt edge module is shown in FIG. 6. In this version, a roller 44 is mounted in a cavity 64 formed in the side edge of the belt module 28. A salient portion 50 of the roller extends beyond the side edge of the module. The roller can rotate about an axis of rotation 66 generally in the longitudinal direction of belt travel. In another version, shown in FIG. 7, the module 28 has an obliquely arranged cavity 64' in which a roller 44 is oriented at an angle α with respect to the vertical (or thickness) direction 68, in which α>90°. (In the version of FIG. 6, α=90°.) If the module of FIG. 7 is at the inner side edge of a belt traveling in the direction of arrow 70 up a helical path around a spiral tower in which the helical path is inclined at the same angle α, the axis of rotation 67 will be perpendicular to the vertical axis of the tower, or lie in the horizontal plane. It may be that some spiral conveyors operate better with a belt having an angle α≠90°.

Figure 8:
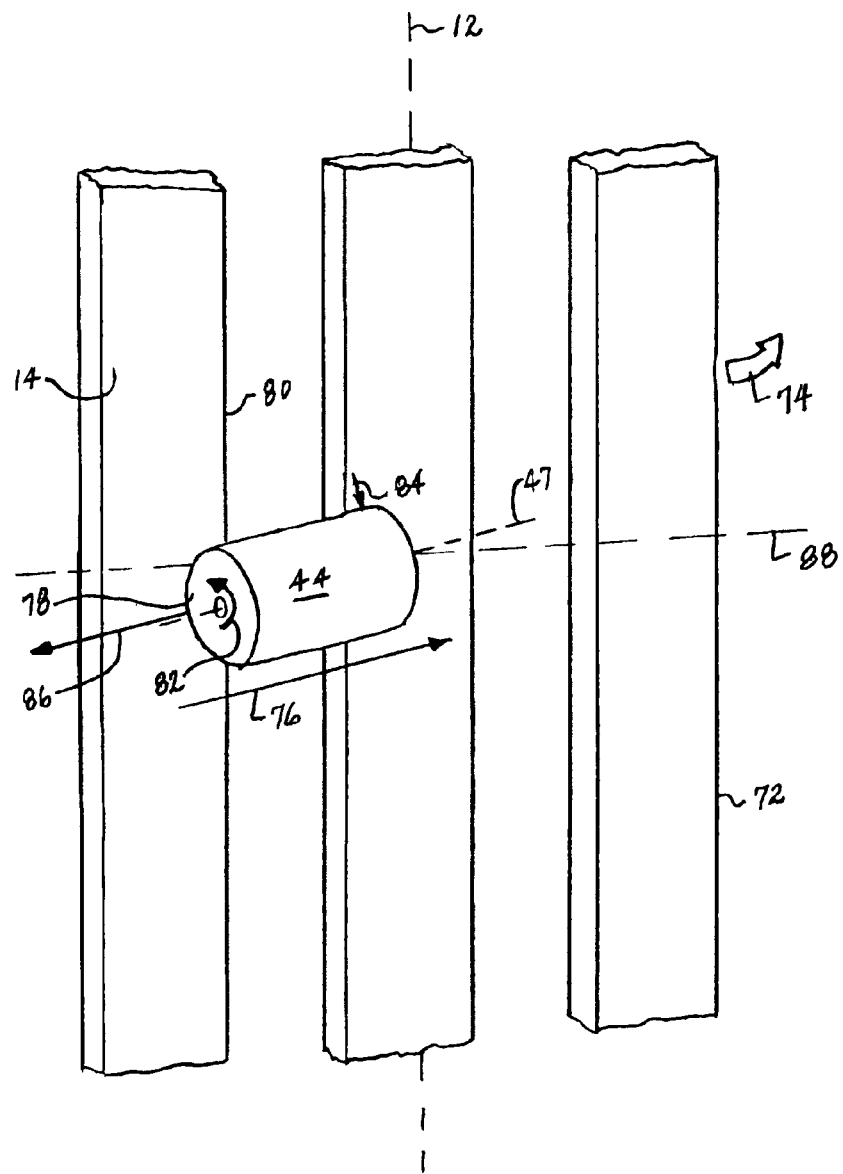
FIG. 8 is a pictorial schematic of the interaction of a belt-edge roller as in FIG. 6 with a spiral conveyor as in FIG. 1.

The interaction of a belt-edge roller with a spiral tower is shown in FIG. 8. A portion of the outer surface 14 of a tower is represented by three vertical strips 72. These strips could be metal, but are preferably made of a plastic material such as polypropylene. The strips are spaced apart horizontally and maintained in place by the tower's internal framework. The tower rotates about its vertical axis 12 in the direction of arrow 74. An inside-edge belt roller 44, such as from a belt like those described previously, is shown following a helical path in the direction of arrow 76 around the tower. In a preferred overdrive condition, the tower rotates faster than the belt advances circumferentially around the tower. Because the roller contacts the outer surface of the strips along a line of contact generally parallel to the axis of rotation 47 of the roller, the roller rubs along the outer surfaces of the strips in frictional contact. In this way, the desirable high-friction engagement of the inside of the belt with the rotating tower is achieved. Furthermore, for cage-type drums with discontinuous outer surfaces as in FIG. 8, the trailing end 78 of the roller can be caught by the leading edges 80 of the vertical strips to impart intermittent positive engagement between the tower and the belt to further assist the belt along the helical path. Although high friction in the direction of belt travel is desirable to drive the belt, low friction in the vertical direction is desirable to allow the belt to move upward along its helical path. As the belt climbs along the tower, the roller rotates about its axis of rotation as shown by arrow 82. The rolling contact of the roller against the outer surface of the tower reduces the vertical frictional force to a rolling frictional force 84 much less than the circumferential frictional force 86 caused by the roller rubbing against the tower on its helical path.

If the belt of FIG. 7 were shown in a diagram as in FIG. 8, its obliquely arranged roller would be oriented with its axis of rotation more nearly in the horizontal direction 88. Such an orientation may reduce the vertical component of friction even further and be valuable in certain applications.

Although the belts and rollers described could be made of metal, it is also possible, and perhaps preferable, to use plastic belts, such as modular plastic belts made by injection-molded thermoplastic materials, such as polypropylene, polyethylene, acetal, nylon, and plastic/fiber composites. The roller could likewise be molded of such materials, but could even be molded or covered with a rubber-like coating for higher-friction contact or with a urethane coating for high friction and durability. The axle is preferably a strong material such as stainless steel.

Although the invention has been described with respect to a few preferred versions, other versions are possible. For example, the rollers could be spherical rather than cylindrical. As another example, the roller could rotate about a fixed axle, rotate with an axle retained rotatably at its ends by supports, or rotate with axle stubs extending from the ends of the roller. The roller edge belt of the spiral conveyor could be other than a modular plastic conveyor belt—a metal or fabric belt, for instance. Furthermore, the invention is valid for descending spirals as well as the ascending spiral systems shown in the examples. Thus, as these few examples suggest, the claims are not meant to be limited to the preferred versions described.

What is claimed is:

1. A modular conveyor belt suitable for use in spiral conveyors, the modular conveyor belt comprising:

a series of rows of belt modules, each row extending in a longitudinal direction from a first end to a second end, in a lateral direction from a first side edge to a second side edge, and in a thickness direction from a top side to a bottom side, wherein consecutive rows are hingedly connected end to end to form a conveyor belt; and a first roller extending outward from the first side edge of selected rows of belt modules, the first roller having an axis of rotation oriented generally perpendicular to the lateral direction and forming a non-zero angle α with the thickness direction.

2. A modular conveyor belt as in claim 1 wherein the angle α is about 90°.

3. A modular conveyor belt as in claim 1 wherein the selected rows include a second roller at the first side edge and wherein the second roller is spaced from the first roller in the thickness direction and has an axis of rotation parallel to the axis of rotation of the first roller.

4. A modular conveyor belt as in claim 1 further comprising a detachable roller assembly supporting the first roller at the first side edge of the belt.

5. A modular conveyor belt as in claim 1 further comprising:
   a pair of supports extending outward from the first side edge; and
   an axle through the first roller and supported at opposite ends by the supports, the axle defining the axis of rotation.

6. A modular conveyor belt as in claim 1 wherein the first roller extends from a cavity opening onto the first side edge of the belt.

7. A modular conveyor belt as in claim 1 wherein the first roller has a urethane outer surface.

8. A spiral conveyor comprising:
   a cylindrical tower having a outer surface and rotatable about a vertical axis; and
   a modular conveyor belt as in claim 1 following a helical path around the cylindrical tower with the first rollers at the first side of the belt engaging the outer surface of the tower along the helical path.

9. An edge module for a modular conveyor belt, the edge module comprising:
   a module body extending in a longitudinal direction from a first end to a second end, in a lateral direction from a first side edge to a second side edge, and in a thickness direction from a top side to a bottom side; and
   a first roller extending outward from the first side edge, the first roller having an axis of rotation oriented generally perpendicular to the lateral direction and forming a non-zero angle α with the thickness direction.

10. An edge module as in claim 9 wherein the angle α is about 90°.

11. An edge module as in claim 9 further comprising a second roller at the first side edge and wherein the second roller is spaced from the first roller in the thickness direction and has a parallel axis of rotation.

12. An edge module as in claim 9 further comprising a detachable roller assembly supporting the first roller at the first side edge.

13. An edge module as in claim 9 further comprising:
   a pair of supports extending outward from the first side edge; and
   an axle through the first roller and supported at opposite ends by the supports, the axle defining the axis of rotation.

14. An edge module as in claim 9 wherein the first roller extends from a cavity opening onto the first side edge.

15. An edge module as in claim 9 wherein the first roller has a urethane outer surface.

16. A spiral conveyor comprising:
   a cylindrical tower having an outer surface and rotatable about a vertical axis; and
   a conveyor belt, extending in a lateral direction from an inner belt edge to an outer belt edge and in a thickness direction from a top side to a bottom side, arranged to move in a helical path around the tower with the inner belt edge proximate the outer surface of the tower and including rollers disposed along the inner belt edge to engage the outer surface of the tower in rolling contact, the rollers having an axis of rotation oriented generally perpendicular to the lateral direction and forming a non-zero angle α with the thickness direction.

17. A spiral conveyor as in claim 16 wherein the axis of rotation of each roller is parallel to the helical path around the tower.

18. A spiral conveyor as in claim 16 wherein the axis of rotation of each roller is perpendicular to vertical.

* * * * *